United States Patent [19]
Courtright

[11] 3,980,098
[45] Sept. 14, 1976

[54] POWER ASSIST STRUCTURE FOR SIDE ROLL WHEEL LINES

[75] Inventor: Burr Courtright, LeGrande, Oreg.

[73] Assignee: Chzo, Inc., LeGrande, Oreg.

[22] Filed: May 27, 1975

[21] Appl. No.: 580,584

[52] U.S. Cl. .................................. 137/344; 239/212
[51] Int. Cl.² ........................................ B05B 15/00
[58] Field of Search ..................... 137/344; 239/212

[56] References Cited
UNITED STATES PATENTS

| | | | |
|---|---|---|---|
| 2,730,403 | 1/1956 | Huntley | 137/344 |
| 2,892,466 | 6/1959 | Stilwell et al. | 137/344 |
| 3,386,661 | 6/1968 | Olson et al. | 239/212 X |
| 3,766,937 | 10/1973 | Lundvall et al. | 239/212 X |

*Primary Examiner*—Alan Cohan

[57] ABSTRACT

A torque-assist mechanism for side roll wheel-line, such mechanism being operative by and responsive to fluid pressure within the axial conduit of the line for rotating or torquing such line at a point removed from a prime mover where associated therewith.

10 Claims, 7 Drawing Figures

POWER ASSIST STRUCTURE FOR SIDE ROLL WHEEL LINES

The present invention relates to agricultural wheel-lines and, more particularly, to a mechanism responsive to fluid pressure as carried by the line for progressively revolving such line.

Wheel-lines, otherwise known as side-roll wheel-lines, are well known in the irrigation art as relates to large grain and alfalfa fields, and so forth. These lines may be as much as ¼ mile long or longer, and comprise a central axial conduit provided with spaced wheels. A prime mover is generally associated with the line at its center and operates to move the line from place to place as desired. For certain types of lines the prime mover simply comprises a tractor which moves the line, after one sprinkling interval at a particular location, to a second location, for subsequent sprinkler irrigation. An improved prime mover, see inventor's U.S. Pat. No. 3,848,625, contemplates a prime mover responsive to fluid pressure for progressively moving the line very slowly over a given field.

Frequently it becomes desirable, especially where long wheel-lines are involved, for a power-assist to be incorporated at points spaced along the line from the prime mover. Such a provision prevents "drag" at the ends of the line and reduces torsion loading of a strain imposed upon the line and the twisting moments which might be involved. Accordingly, where the torque-assist mechanism of the invention is used, at one or more spaced points on either side of the prime mover, then the torquing or revolving of the axial conduit at a series of mutually spaced points will aid in keeping the line straight and reduce torsion strain on the central conduit of the line.

Accordingly, a principal object of the present invention is to provide a torquing mechanism to be operatively associated with the axial conduit of a side roll wheel-line.

An additional object is to provide a torquing mechanism which is responsive to fluid pressure carried by a line for revolving such line.

A further object is to provide a cylinder, ratchet combination which utilizes the fluid under pressure carried by such line for actuating the cylinder and thereby actuating the ratchet means operatively associated with the line.

An additional object is to provide a torque-assist mechanism, which may be used in conjunction with a prime mover, for assisting in torquing or rotating the axial conduit of the line at a point remote from such prime mover.

The features of the present invention which are believed to be novel are set forth with particularity in the appended claims. The present invention, both as to its organization and manner of operation, together with further objects and advantages thereof, may best be understood by reference to the following description, taken in connection with the accompanying drawings in which:

Figures 1, 1A, 1B, 2:
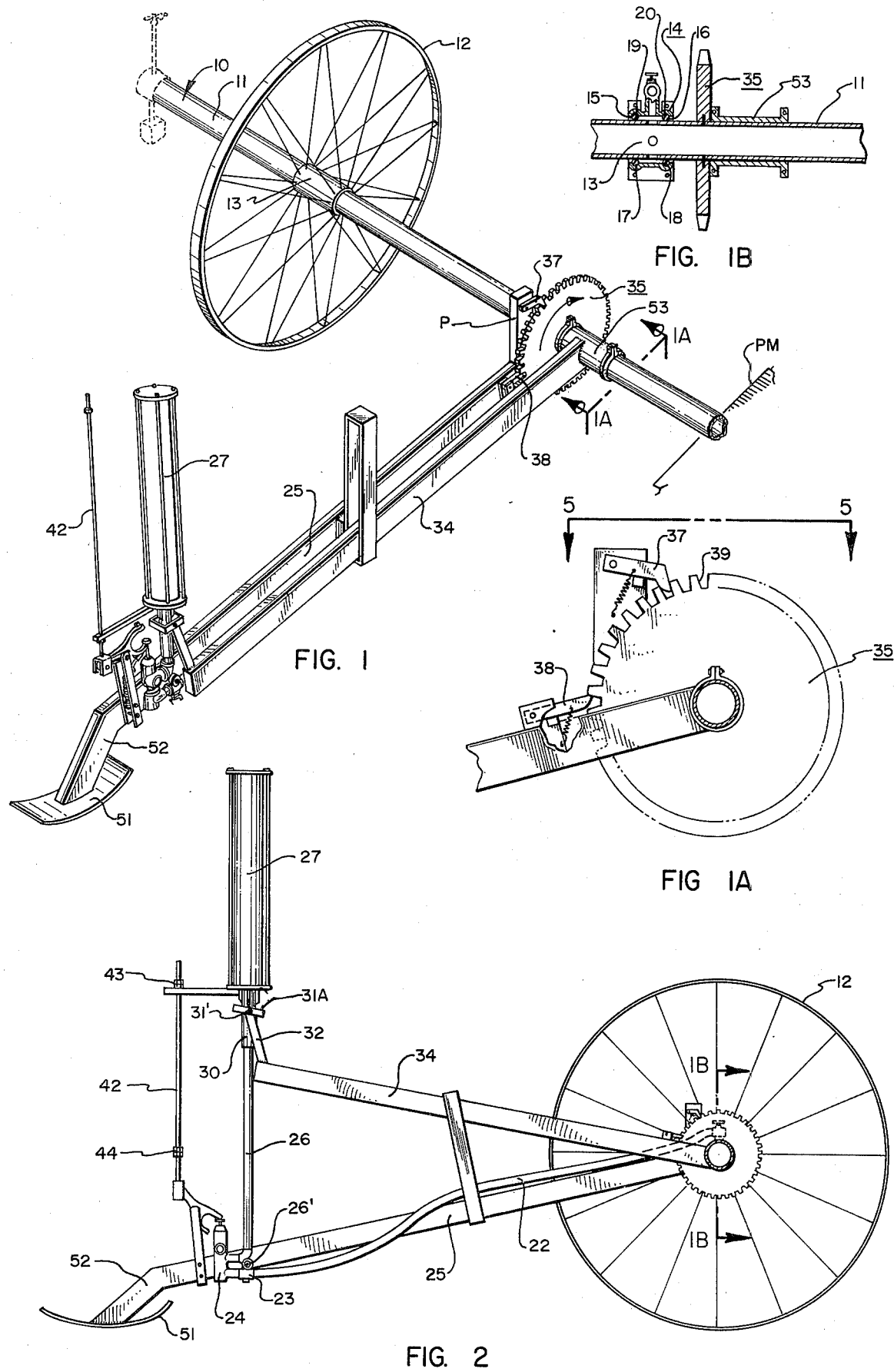
FIG. 1 is a fragmentary perspective view of an agricultural, side roll wheel-line, the same being provided with the torquing mechanism in a preferred embodiment of the invention.
FIG. 1A is an enlarged section taken along the line 1A-1A in FIG. 1, illustrating the ratchet means used in revolving the axial conduit of the wheel-line.
FIG. 1B is an enlarged section taken along the line 1B-1B in FIG. 2, illustrating a representative water-jacket coupler that can be used with the axial conduit of the wheel-line to both supply water from the axial conduit to the operative cylinder and also to mount a leg of the mechanism thereto.
FIG. 2 is a side elevation of the ratchet means coupled, mechanically and hydraulically, to the wheel-line control conduit for supplying supplementary torque thereto at a point remote from the prime mover of the wheel-line.

In FIG. 1 side roll wheel-line 10 includes central axial conduit 11 and a plurality of wheels 12 mounted thereon at their hubs 13. For convenience but one wheel is shown and the particular riser and sprinkler equipment associated with conduit 11 is indicated in dotted lines. Prime mover PM may be powered by the fluid pressure within the line and comprise the prime mover of the inventor's prior patent, U.S. Pat. No. 3,848,625.

Disposed over perforate portion 13 of conduit 11 is a water jacket 14 which is secured and sealed in place by O-rings 15 and 16 and accommodating grooves in the conduit and jacket at 17–10. The jacket may be made of split and bolted construction or any other conventional way and will include an outlet 21. To outlet 21 is connected a flexible conduit 22 which connects to port 23 of valve 24. Valve 24 may be either a two-way or three-way valve and is pivotally mounted upon ground leg 25. Pivot 26' hence simply serves as a mount for valve 24.

Figure 3:
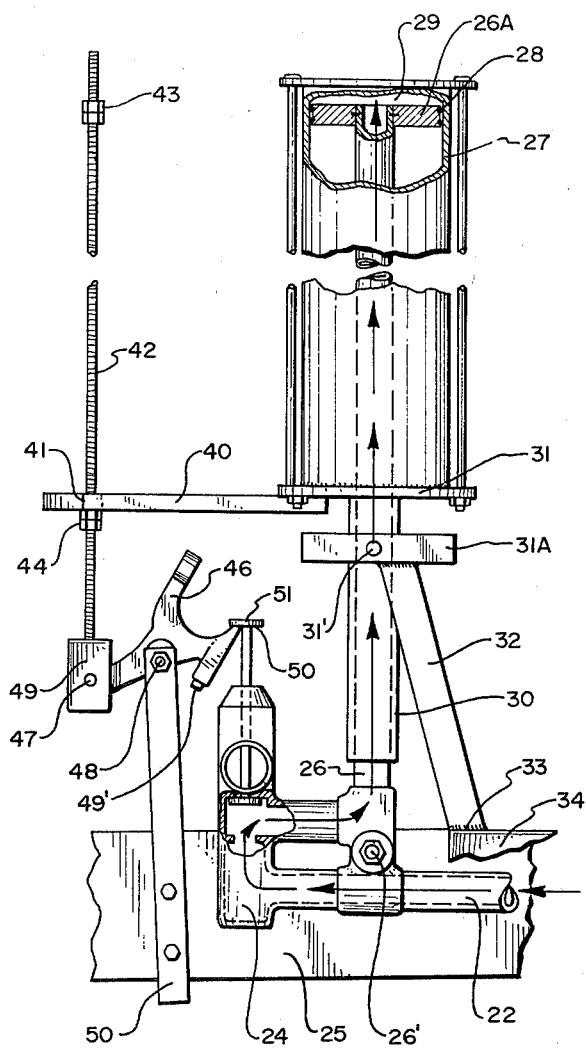
FIG. 3 is an enlarged fragmentary elevation of the left portion of FIG. 2, illustrating a cylinder-extension condition and a raising of an actuating leg, both being responsive to the fluid pressure and fluid introduction into the cylinder.

Piston rod 26 is pivoted to the pivot means 26' along with valve 24. Piston rod 26 is hollow and serves as a fluid conduit, being coupled to valve 24 in the manner shown in FIGS. 2 and 3. Fluid conductive piston rod 26 is operably associated with and is connected to piston 26A of cylinder 27. Piston 26A has the usual O-ring seals 28 and, in operation, is forced downwardly by virtue of pressured fluid accumulating at space 29 within the cylinder as shown in FIG. 3.

Cylinder 27 includes a forward cylinder sleeve extension 30 that may be welded to the cylinder proper at 31. Extension 30 slides over piston rod 26 in the manner shown in FIGS. 3 and 4. Pivotally connected to sleeve extension 30 is an open, square-configured member 31A that is pivoted by suitable pivot bolts 31', one being shown and the two being opposed, relative to sleeve extension 30. Welded to member 31A is a connecting rod 32 that also is welded at its lower extremity 33 to the movable leg 34. It will be seen that the ground leg 25 is fixedly mounted as by welding to the jacket or sleeve 14. Main gear 35 is keyed to axial conduit 11 and cooperates with the pawl mechanism. Gear 35 is a ratchet wheel.

In FIG. 1 it is seen that spring-loaded pawls 37 and 38 engage main gear 35 and are so situated that the upper pawl, mounted to leg 25 by leg post P, prevents a reverse rotation of the main gear whereas the bottom pawl mounted to movable leg 34 urges the main gear 35 into a forward rotation. In operation, therefore, and as will be explained more fully hereinafter, the raising of the movable leg 34 effects a movement of lower pawl 38 in locked engagement with gear 35 so as to rotate such gear and also rotate the axial conduit 11. When the movable leg 34 extends, however, as shown in the manner beginning at FIG. 4, then the lower pawl slips over the teeth 39 of the ratchet-acting gear 35 until the movable leg 34 descends all the way to the position shown in FIG. 1. As seen, movable leg 34 is provided with a split journal mount 53 relative to the axial conduit of the wheel-line and about which it freely revolves.

In considering the valve-actuating mechanism for valve 24, cylinder 27 is shown to include an extension arm 40 which is essentially horizontal and includes aperture 41. Disposed in aperture 41 is a valve rod 42 having a pair of limit stops 43 and 44. Each of these limit stops may comprise a lock nut pair 45. A clevis-type valve actuator 46 is pivoted at 47 and 48 by suitable pivot means thereat to terminal block 49 and also strap 50, the latter being secured to ground leg 25.

Valve 24 is a two-way valve showing an open condition leading from conduit 12 through the valve into piston rod 26.

Figure 4:
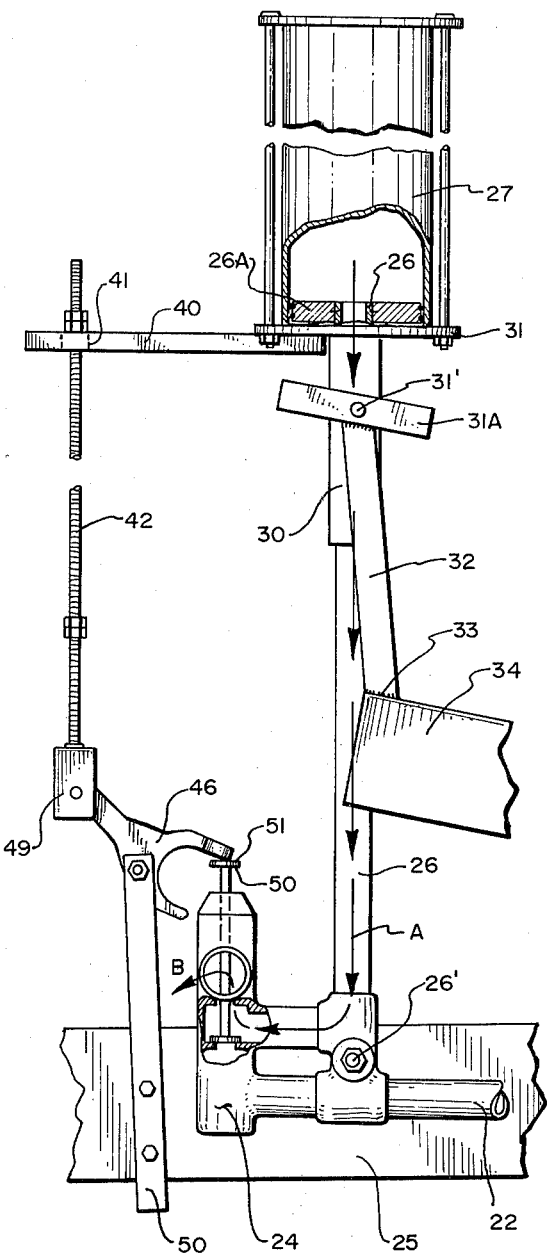
FIG. 4 is similar to FIG. 3 but illustrates that once a wheel has been rotated, responsive to the movement of the operative leg of FIG. 3, the cylinder then descends and the valve condition is reversed so that fluid from the cylinder is exhausted, i.e. simply drained to the ground, preparatory to a repetition of the cycle.
Figure 5:
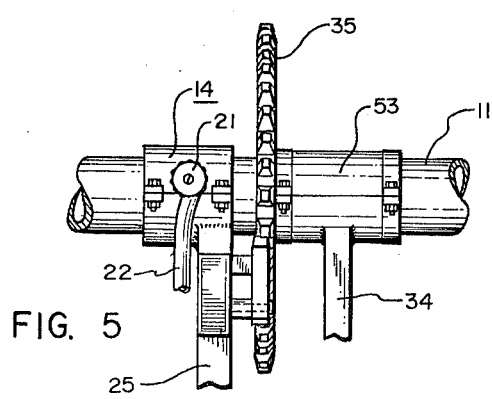
FIG. 5 is a top plan taken along the line 5—5 in FIG. 1A.

FIG. 4 illustrates the valve in a reverse condition wherein fluid is gravity-pressured out of the cylinder by the piston 26A in the manner shown by the arrows at A, which as seen indicates that fluid is simply spilled onto the ground from the valve.

FIG. 3 illustrates the actuator 46 in a first condition wherein the end of adjustment screw 49' engages the underside 50 of the poppet of the valve. This enables a direct communication of fluid from axial conduit 11, by the valve, into cylinder 27. Now this is the situation for the expansion of the cylinder and piston combination such that fixed extension arm 40 proceeds up rod 42. When the uppermost stop at 43 is achieved as seen in FIG. 2 and FIG. 4, then the direction of valve flow is reversed through the pivoting of yoke actuator 46 in the manner seen in FIG. 4 when fluid is now permitted to drain from the cylinder through the valve and out in the direction as shown by the arrow B.

Accordingly, what is provided is somewhat of a scissor effect, simply a pivoting of two elongate members which are pivoted together, see members 25 and 34, such that one member rides along the ground via skid 51, as attached to canted portion 52 of leg 25, whereas the other leg 34 scissors up and down in response to the movement of the cylinder and the connecting arm 32 leading to member 31. Thus, the up-and-down movement of movable leg 34 in response to the extension of the cylinder relative to its piston rod as pivoted to member 25, and the subsequent retraction of the cylinder by gravity owing to the release of fluid pressure thereon through valve 24 in the manner shown in FIG. 4, effects a sequential ratcheting of main gear 35 so as to provide for sequential movement of axial conduit 11.

This type of movement may be used either singly or simply as part of a power movement for a wheel-line system.

It is noted that through the pivoting of the cylinder to pivot means 26', the axis of the cylinder will rotationally displace slightly about this pivot point so as not to require slotted holes or other means such as a linkage adjustment in lieu of connecting arm 32. However, such a link with its articulative feature may be employed, if desired.

In operation, the axial conduit 11 is supplied pressured water which may or may not include chemicals for fertilizer usage or for other means.

This pressure is used not only for sprinkling purposes proper of the wheel-line but also to power the power-assist mechanism generally shown in FIG. 1, and in the remaining figures in detail. Ground leg 25 has a relatively fixed orientation in that the skid 51 always contacts the ground plane. This ground leg will be rigidly secured to the jacket or manifold 14, which likewise maintains an essentially fixed disposition relative to the axial conduit or pipe which revolves therewithin, see axial conduit 11.

Main or bull gear 35 serves as a ratchet wheel which is fixedly keyed to the axial conduit 11. Spring-loaded pawl 37 is attached to the movable leg 34, whereas the other pawl 38 is attached to the fixed or ground leg 25. The latter power-assists in the torquing or revolvement, in true ratchet fashion, of gear 35 and hence torques the axial conduit 11. The reverse rotation is prevented by virtue of the pawl arrangement at 37 which is fixed to ground leg 25 and prevents a reverse rotation of the gear 35.

The shape of the forward portions of the pawls and their correlation with the sides of the teeth of the main gear are important, see FIG. 1A, and ensure that a portion of the "throw" is not lost during rotational displacement of the gear by the pawl.

What is provided, therefore, is an unusual and yet inexpensively manufactured power or power-assist torquing structure where the central lines or axial conduit of wheel-lines, whereby the water pressure carried thereby may be used actually to torque the line; this power-assit may be employed in conjunction with prime mover PM or separately.

While particular embodiments of the present invention have been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

I claim:

1. A side-roll wheel line including in combination, a central, axial conduit for supplying irrigation water and having a perforate portion, wheel means mounted to said conduit for carrying the same, a water jacket sealed to and enveloping said perforate portion of said conduit, said water jacket having a fluid outlet port, an elongate fixed leg secured to and transversely extending from said water jacket and having an outer end constructed for sliding on the ground, a main gear keyed to said conduit, a movable leg pivotally disposed relative to said fixed leg, said movable leg carrying pawl means engaging said main gear for advancing the same in response to liftings of said movable leg, a piston and cylinder combination interposed between said movable leg and said fixed leg for successively raising and lowering the former relative to the latter, valve means intercoupled between said jacket port and said cylinder for actuating said piston in successive, opposed directions, and control means responsive to cylinder movement relative to said piston for controlling said valve means.

2. The structure of claim 1 wherein said fixed leg includes a ground-contact skid.

3. The structure of claim 1 wherein said fixed leg is provided with spring-biased pawl means operatively engaging said main gear for preventing the reverse rotation thereof during movable leg descents.

4. The structure of claim 1 wherein said main gear comprises a ratchet wheel fixed to said conduit.

5. The structure of claim 1 wherein said control means comprises an actuating rod coupled to said valve means and provided with mutually spaced limit stop means successively engaging said piston and cylinder combination for actuating said valve means.

6. The structure of claim 1 wherein said cylinder includes a laterally extending arm, said control means being operably connected to and selectively engaging said arm.

7. The structure of claim 1 wherein said piston includes a hollow piston rod coupled to said valve means and constructed for passing water through said piston, said cylinder including a fixed axial sleeve containing said piston rod, said sleeve being affixed to said movable leg.

8. The structure of claim 1 wherein said fixed and movable legs are provided with means for guiding the relative movement therebetween in a planar relationship.

9. In combination, a side roll wheel-line; a prime mover means for torquing and thereby advancing said wheel-line over a field to be irrigated, and means engaging said wheel-line and spaced along said wheel-line remote from said prime mover means for applying supplemental torque to said wheel-line at a point spaced from said prime mover means.

10. In combination, an agricultural, irrigation wheel-line including a central, axial, water-flow conduit and wheel means keyingly mounted thereto for supporting said conduit; and ratchet means mechanically and hydraulically coupled to said conduit and responsive to fluid pressure therewithin for applying torque to said conduit to revolve said wheel means.

* * * * *

UNITED STATES PATENT OFFICE
CERTIFICATE OF CORRECTION

Patent No. 3,980,098   Dated September 14, 1976

Inventor(s) BURR COURTRIGHT

It is certified that error appears in the above-identified patent and that said Letters Patent are hereby corrected as shown below:

On front page, change "Inventor: Burr Courtright, LeGrande, Oreg." to read --Inventor: Burr Courtright, La Grande, Oreg.--

On front page, change "Assignee: Chzo, Inc., LeGrande, Oreg." to read --Assignee: $CH_2O$, Inc., La Grande, Oreg.--

Column 2, line 38, change "17-10" to read --17-18--.

Drawing change: Add numeral 21 and its lead line as shown below.

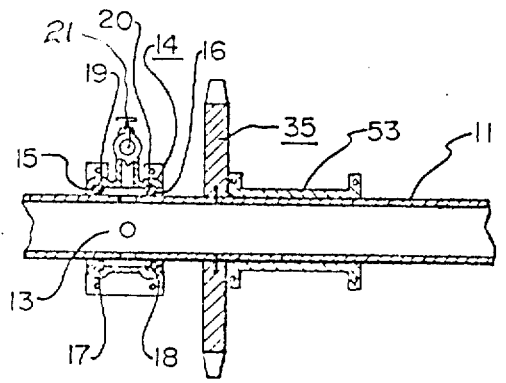

FIG. 1B

Signed and Sealed this

Twenty-fifth Day of January 1977

[SEAL]

Attest:

RUTH C. MASON
Attesting Officer

C. MARSHALL DANN
Commissioner of Patents and Trademarks